United States Patent [19]

Naarmann et al.

[11] 4,143,221

[45] Mar. 6, 1979

[54] MANUFACTURE OF BROMINATED POLYMERIZATION PRODUCTS OF STYRENE

[75] Inventors: Herbert Naarmann, Wattenheim; Klaus Penzien, Frankenthal; Wolfgang Schulte, Hassloch, all of Fed. Rep. of Germany

[73] Assignee: BASF Aktiengesellschaft, Ludwigshafen, Fed. Rep. of Germany

[21] Appl. No.: 844,927

[22] Filed: Oct. 25, 1977

[30] Foreign Application Priority Data

Nov. 11, 1976 [DE] Fed. Rep. of Germany ....... 2651435

[51] Int. Cl.$^2$ ................................................ C08F 8/22
[52] U.S. Cl. ........................................ 526/44; 526/21; 526/43; 526/48.2
[58] Field of Search ................................. 526/44, 43

[56] References Cited

U.S. PATENT DOCUMENTS

| | | | |
|---|---|---|---|
| 3,959,398 | 3/1976 | Jalics | 526/43 |
| 4,028,486 | 6/1977 | Jalics | 526/43 |
| 4,074,032 | 2/1978 | Naarmann et al. | 526/43 |

*Primary Examiner*—William F. Hamrock
*Attorney, Agent, or Firm*—Keil & Witherspoon

[57] ABSTRACT

Styrene polymers or copolymers containing bromine are manufactured by cationic polymerization of the monomer, or of the monomer plus a copolymerizable monomer of the isobutylene or nuclear-alkylated styrene type, in an organic solvent in the presence of a Lewis acid catalyst. Bromine is then added to the solution without first working up the latter. The catalyst used for the bromination is the same as that used for the polymerization. If necessary, fresh catalyst may be added before the bromination. After completion of the bromination the reaction solution is extracted with water until it is bromide-free, and the solvent, generally a halohydrocarbon, is then stripped off. Products containing up to about 80% by weight of bromine may be obtained. They have a pale yellowish color and exhibit no significant decomposition up to 340° C. They may be used as flame-proofing agents for thermoplastics.

8 Claims, No Drawings

MANUFACTURE OF BROMINATED POLYMERIZATION PRODUCTS OF STYRENE

The present invention relates to a process for the manufacture of brominated polymerization products of styrene by direct bromination of styrene polymers.

Brominated styrene polymers can in principle be manufactured in two ways, namely by polymerization of suitable brominated styrenes or by direct bromination of the styrene polymers. However, all conventional processes of this type suffer from various difficulties and disadvantages.

Styrene polymers are usually manufactured by thermal or free-radical initiated polymerization. When the styrene polymers are brominated directly, the polymer main chain is attacked in every case, resulting in substantial changes in viscosity. For example, when using the conventional technique of cold bromination in chlorinated solvents, with Lewis acid catalysts, conventional polystyrene gives deeply colored reaction products of increased viscosity. If the bromine content is more than 20%, these products are obtained in a swollen or crosslinked state and cannot be worked up to give the pale and heat-stable products required. French Patent No. 1,245,832 discloses the bromination of polystyrene or of polystyrene-containing latices in aqueous emulsions. By this method it is only possible to obtain products with bromine contents of up to about 10% by weight and with a low heat stability; these products have not attained any practical significance.

All conventional processes for directly brominating styrene polymers have hitherto only given products of low and inadequate heat stability. Heat-stable styrene polymers have hitherto only been obtainable by polymerization of nuclear-brominated styrene, a process being described, for example, in German Patent No. 1,570,395. The processes for the manufacture of brominated styrene polymers by polymerizing nuclear-brominated styrene have the disadvantage that they must be carried out in several stages and accordingly entail a great deal of expenditure on equipment.

It is an object of the present invention to provide a process whereby brominated polymerization products of styrene may be manufactured simply and economically, the products having a very high bromine content coupled with good heat stability and a very slight intrinsic color.

We have found that this object is achieved by first cationically polymerizing styrene by means of Lewis acid catalysts and then brominating the polymerization product obtained.

Accordingly, the present invention relates to a process for the manufacture of brominated polymerization products of styrene of polymerizing styrene and then brominating the polymerization products obtained, in which process styrene or a mixture of styrene with copolymerizable monomers is cationically polymerized in solution in the presence of a Lewis acid catalyst, bromine is added to the reaction solution, with or without first adding a further amount of Lewis acid catalyst, and after completion of the bromination reaction the reaction solution is washed bromide-free with water in the conventional manner and the brominated polymerization product is isolated from the reaction solution.

Either styrene alone or a mixture of styrene with other monomers, cationically copolymerizable with styrene, eg. olefinically unsaturated hydrocarbons, may be employed in the process according to the invention. Examples of monomers cationically copolymerizable with styrene are isobutylene and nuclear-alkylated styrenes such as vinyltoluene, vinylethylbenzene and vinylpropylbenzene. The comonomers may be employed in amounts of up to 50% by weight, preferably in amounts of from 5 to 20% by weight, based on the mixture of styrene and comonomers. However, the use of styrene alone is preferred.

The cationic polymerization of styrene, or of mixtures of styrene with copolymerizable monomers, by means of a Lewis acid catalyst may be carried out in the conventional manner. Suitable Lewis acid catalysts for the process according to the invention are, in particular, boron trifluoride, boron trifluoride etherates, eg. boron trifluoride diethyl-etherate, aluminum chloride, aluminum bromide, iron-(III) chloride, antimony-(III) chloride and tin tetrachloride. The halides of boron and of aluminum have proved particularly advantageous. The amount of Lewis acid catalyst employed depends above all on the desired molecular weight and on the desired molecular weight distribution of the polymer and is in general from 1 to 20% by weight, preferably from 2 to 15% by weight, based on the total amount of monomer to be polymerized.

The cationic polymerization of styrene or of mixtures of styrene with a copolymerizable monomer must be carried out in solution. Preferably, solvents are employed in which both the immediate polymerization product of styrene, and the bromination product of the polymerization product, are soluble. Halohydrocarbon solvents have proved particularly advantageous. Examples of suitable solvents are methylene chloride, chloroform, carbon tetrachloride, 1,2-dichloroethane, 1,1,2-trichloroethane, dibromomethane, 1,2-dibromomethane and the corresponding fluorohydrocarbons or mixed fluorochlorohydrocarbons. It is also possible to use aromatic halohydrocarbon solvents. The concentration of the monomers in the solvent is not a critical factor in the process; for economic reasons it is advantageous to keep the concentration as high as possible. Usually, sufficient solvent is employed that the resulting concentration of the monomers or of the finished polymer is from 10 to 60% by weight, based on the reaction solution.

In general, the polymerization is carried out by allowing the styrene or the mixture of styrene and copolymerizable monomers to run into the mixture of solvent and Lewis acid catalyst, with thorough mixing of the reaction solution. When chlorohydrocarbons are employed as the solvent, the polymerization temperature should not exceed +20° C, in order to avoid undesirable side-reactions. The lower limit of the polymerization temperature depends on the chosen solvent and is imposed by the melting point of the latter. Usually, the polymerization temperature is from −60° to +20° C. In other respects, the polymerization may be carried out under the conventional conditions of cationic polymerization, ie. in an inert gas atmosphere and in the absence of moisture.

It has proved advantageous to carry out the polymerization in such a way that the mean molecular weight of the polymerization product is from 800 to 8,000. These figures relate to the number-average molecular weight determined by vapor pressure osmometry. In general, due to the polymerization process used, the product has a very broad molecular weight distribution. However, in principle, polymerization products with a lower or higher molecular weight can also be used for the subsequent bromination.

For practical reasons, the bromination is carried out directly after the polymerization, without first isolating the polymerization products from the reaction solution. In general, the bromination reaction is carried out by adding the bromine slowly, whilst stirring, to the solution of the styrene polymerization products obtained in the first process stage. To achieve very uniform bromination it is advantageous to use a concentration of the polymerization products in the reaction solution, during the bromination, of from 10 to 40% by weight, based on the solution. If the concentration of the polymerization product, as obtained from the polymerization, is higher, it can be adjusted appropriately by adding further solvent.

Since the polymerization has already been carried out in the presence of a Lewis acid as the catalyst, it is in general not necessary to add any further catalyst to the reaction solution to carry out the subsequent bromination reaction. This is true especially if relatively large amounts of Lewis acid catalyst, of from about 5 to 20% by weight based on the monomers to be polymerized, have been employed for the polymerization. However, it is also possible to add to the reaction solution, after completion of the polymerization, an additional amount of a further, fresh catalyst for the bromination reaction. This addition of the further catalyst is in general made before adding the bromine to the reaction solution. Catalysts which may be added for the bromination reaction are in principle the same Lewis acids as those which can be used for the cationic polymerization of styrene. The amount of fresh Lewis acid catalyst added is in general from 1 to 20% by weight, preferably from 2 to 10% by weight, based on the polymerization product contained in the reaction solution.

The bromination is carried out cold, preferably maintaining reaction temperatures of from −25° C to +20° C. The amount of bromine added depends on the desired bromine content of the end product and is equivalent thereto. From the point of view of use of the products, brominated polymerization products of styrene containing from 40 to 80% by weight, preferably from 50 to 70% by weight, of bromine are particularly desirable. To complete the bromination reaction, stirring of the mixture at the reaction temperature and/or at room temperature can be continued after adding the bromine.

To work up the reaction solution, the latter may be washed with water in the conventional manner, until the wash water is neutral and free from bromide ions. A conventional extraction sequence in bromination reactions is first to extract the reaction solution with aqueous solutions of weak bases and then with aqueous solutions of reducing agents, and finally to wash the solution with pure water. However, as a rule such a procedure can be dispensed with when working up the reaction solution obtained by the process according to the invention, ie. in the case of the present invention it is in most cases adequate to extract the reaction solution with water only.

The brominated polymerization product can be isolated by conventional methods from the reaction solution which has been washed bromide-free. Preferably, the reaction solution is freed from the solvent by evaporation; to remove the last remnants of solvent, the evaporation must in general be completed at above 200° C, under reduced pressure. Continuous working-up methods with short residence times are particularly advantageous.

The intrinsic color of the brominated polymerization products of styrene, manufactured by the process of the invention, can be improved slightly by adding phosphites to the reaction solution, advantageously after the latter has been extracted with water but before the solvent has been evaporated. Suitable color improvers are organic phosphites of sufficiently high boiling point. The boiling point of the organic phosphites should be above the temperature required to remove residual solvent from the reaction mixture and is advantageously above 240° C under reduced pressure. Examples of suitable compounds are trialkyl phosphites, triaryl phosphites or cycloalkyl phosphites and the mixed aliphatic-aromatic phosphites, in which compounds each alkyl, aryl or cycloalkyl is preferably of 6 to 14 carbon atoms. The organic phosphites are suitably added to the reaction solution, during working up, in amounts of from 0.005 to 15% by weight, preferably from 0.05 to 0.3% by weight, based on the brominated polymerization product of styrene. Further additives which may be employed during working up are the known conventional stabilizers for halogen-containing polymers, in amounts of from 0.1 to 10% by weight, based on the brominated polymerization product of styrene.

The brominated polymerization products of styrene, obtained by the process of the invention, are distinguished by great heat stability and a slight intrinsic color. Even at high bromine contents, of up to about 70% by weight, they are colorless to pale yellowish solids. On heating, they give colorless to red melts and exhibit no significant decomposition, due to elimination of hydrogen bromide, or significant discoloration, even at from 240° to 340° C. The process according to the invention permits the manfacture of highly brominated heat-stable polymerization products of styrene, starting from styrene and bromine, in a simple and economical manner, in a single reaction batch and with yields of from 90 to 95% by weight. The brominated polymerization product of styrene may be used, for example, as flameproofing agents for thermoplastics.

The Examples which follow illustrate the invention. In the Examples, parts and percentages are by weight, unless stated otherwise.

EXAMPLE 1

104 parts of styrene are run slowly, whilst stirring, into a mixture of 375 parts of dry 1,2-dichloroethane and 2 parts of aluminum chloride, whilst keeping the reaction temperature at from +5° to +10° C by cooling. After stirring for a further 20 minutes, an additional 4 parts of aluminum chloride are introduced and 205 parts of bromine are then run in. After stirring for a further 20 minutes, water is added. The organic phase is freed from the catalyst and hydrogen bromide by repeated extraction with water. After adding 0.3 part of tridecyl phosphite, the solvent is distilled off, the last remnants of solvent being removed at 240° C bath temperature, under reduced pressure. The hot melt is poured out and is comminuted when it has solidified. 196 parts of a powder containing 50.1% of bromine are obtained.

A molten layer 1 cm thick shows a pale yellow color which hardly deepens on heating for half an hour at 260° C.

EXAMPLE 2

104 parts of styrene are run slowly, whilst stirring, into a mixture of 375 parts of dry 1,2-dichloroethane and 5 parts of aluminum chloride, whilst keeping the reaction temperature at from +5° to +10° C by cooling. After stirring for a further 20 minutes, an additional 5 parts of aluminum chloride are introduced and 325 parts of bromine are then run in. After stirring for a further 20 minutes, water is added. The organic phase is freed from the catalyst and hydrogen bromide by repeated extraction with water. After adding 0.3 part of tridecyl phosphite, the solvent is distilled off, the last remnants of solvent being removed at 240° C bath temperature, under reduced pressure. The hot melt is poured out and is comminuted when it has solidified. 265 parts of a powder containing 63.1% of bromine are obtained.

A molten layer 1 cm thick shows a deep yellow color which hardly deepens on heating for half an hour at 260° C.

EXAMPLE 3

104 parts of styrene are run slowly, whilst stirring, into a mixture of 375 parts of dry 1,2-dichloroethane and 5 parts of aluminum chloride, whilst keeping the reaction temperature at from +5° to +10° C by cooling. After stirring for a further 20 minutes, an additional 12 parts of aluminum chloride are introduced and 480 parts of bromine are then run in. After stirring for a further 20 minutes, water is added. The organic phase is freed from the catalyst and hydrogen bromide by repeated extraction with water. After adding 0.3 part of tridecyl phosphite, the solvent is distilled off, the last remnants of solvent being removed at 240° C bath temperature, under reduced pressure. The hot melt is poured out and is comminuted when it has solidified. 320 parts of a powder containing 69.5% of bromine are obtained.

A 1 cm thick molten layer shows a red color.

EXAMPLE 4

104 parts of styrene are run slowly, whilst stirring, into a mixture of 375 parts of dry 1,2-dichloroethane and 12 parts of aluminum chloride, whilst keeping the reaction temperature at from +5° to +10° C by cooling. After stirring for a further 20 minutes, 352 parts of bromine are run in. After stirring for a further 20 minutes, water is added. The organic phase is freed from the catalyst and hydrogen bromide by repeated extraction with water. After adding 0.3 parts of tridecyl phosphite, the solvent is distilled off, the last remnants of solvent being removed at 240° C bath temperature, under reduced pressure. The hot melt is poured out and is comminuted when it has solidified. 270 parts of a powder containing 63.2% of bromine are obtained.

A molten layer 1 cm thick shows a yellowish brown color which deepens slightly on heating for half an hour at 260° C.

COMPARATIVE EXAMPLE 10 parts of aluminum chloride are added to a solution of 104 parts of commercial polystyrene in 375 parts of 1,2-dichloroethane and bromine is run in at from +5° to +10° C. After adding about 150 parts of bromine, a pronounced rise in viscosity is observed. Shortly thereafter, the reaction mixture is completely crosslinked.

We claim:

1. A process for the manufacture of brominated polymerization products of styrene which comprises:
   (a) cationically polymerizing styrene or a mixture of styrene with copolymerizable monomers in solution in the presence of a Lewis acid catalyst to a mean molecular weight (number average) of from 800 to 8,000 for the polymerization product,
   (b) adding bromine to the reaction solution obtained in step a) to brominate the polymerization product,
   (c) washing the reaction solution with water after the completion of the bromination reaction until it is bromide-free, and then
   (d) separating and isolating the brominated polymerization product from the solvent.

2. A process as claimed in claim 1, wherein a further amount of Lewis acid catalyst is added before adding bromine to the reaction solution.

3. A process as claimed in claim 1, wherein styrene or a mixture of styrene with comonomers in amounts of up to 50% by weight, based on the mixture, is first used, the comonomer being selected from the group consisting of isobutylene, vinyltoluene, vinylethylbenzene and vinylpropylbenzene, and the polymerization is carried out in solution in a halohydrocarbon solvent in the presence of from 1 to 20% by weight, based on the total amount of monomer to be polymerized, of a Lewis acid catalyst.

4. A process as claimed in claim 1, wherein the polymerization of styrene or of the mixture of styrene with the other copolymerizable monomers, and the subsequent bromination, is carried out in chlorohydrocarbon solvents at below +20° C.

5. A process as claimed in claim 1, wherein aluminum chloride is used as the Lewis acid catalyst.

6. A process as claimed in claim 1, wherein an organic phosphite, in an amount of from 0.05 to 0.3% by weight, and a stabilizer in an amount of from 0.1 to 10% by weight, in each case based on the brominated product, are added to the reaction solution before isolating the brominated product.

7. A process as set forth in claim 1, wherein the bromination is carried out at temperatures of from −25° C to +20° C.

8. A process as set forth in claim 1, wherein the polymerization is carried out at temperatures of from −60° C to +20° C.

* * * * *